(12) United States Patent
Kelly et al.

(10) Patent No.: US 7,858,214 B2
(45) Date of Patent: Dec. 28, 2010

(54) METHOD AND APPARATUS FOR LIGHT INTERNAL REFORMING IN A SOLID OXIDE FUEL CELL SYSTEM

(75) Inventors: Sean M. Kelly, Pittsford, NY (US); Bernhard Fischer, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 926 days.

(21) Appl. No.: 11/231,703

(22) Filed: Sep. 21, 2005

(65) Prior Publication Data

US 2007/0065687 A1 Mar. 22, 2007

(51) Int. Cl.
*H01M 4/36* (2006.01)

(52) U.S. Cl. .............................. 429/13; 429/17; 429/19; 429/20

(58) Field of Classification Search ................... 429/13, 429/17, 19, 20, 32
See application file for complete search history.

(56) References Cited

U.S. PATENT DOCUMENTS

| | | | |
|---|---|---|---|
| 5,409,784 A | | 4/1995 | Bromberg et al. |
| 2003/0031900 A1* | | 2/2003 | Tajima et al. ................. 429/19 |
| 2005/0019626 A1* | | 1/2005 | Burch et al. .................. 429/19 |
| 2007/0065687 A1* | | 3/2007 | Kelly et al. .................... 429/17 |

FOREIGN PATENT DOCUMENTS

| | | |
|---|---|---|
| DE | 40 05 468 | 8/1991 |
| WO | 98/21771 | 5/1998 |
| WO | 00/26518 | 5/2000 |
| WO | 02/069430 | 9/2002 |
| WO | 03/019707 | 3/2003 |

OTHER PUBLICATIONS

European Search Report dated Feb. 22, 2007.

* cited by examiner

*Primary Examiner*—Raymond Alejandro
(74) *Attorney, Agent, or Firm*—Thomas N. Twomey

(57) ABSTRACT

In an SOFC stack system, wherein a CPOx reformer supplies reformate to the stack, a portion of the anode tail gas is recycled directly into the anode inlet of the stack, such that the fuel reaching the anodes is a mixture of fresh reformate and recycled anode tail gas and is present at a sufficiently high temperature that endothermic reforming of residual hydrocarbons from the CPOx reformer occurs within the stack. Preferably, an amount of secondary non-reformed fuel is also added to optimize the fuel mixture presented for internal reforming. The anode tail gas is hot, at the stack temperature of 750-800° C., which allows for the mixture of anode tail gas and secondary fuel to be mixed and reacted in a clean-up catalyst to react higher hydrocarbons in the secondary fuel, without additional oxygen, prior to being mixed with reformate and sent to the stack.

3 Claims, 4 Drawing Sheets

METHOD AND APPARATUS FOR LIGHT INTERNAL REFORMING IN A SOLID OXIDE FUEL CELL SYSTEM

This invention was made with United States Government support under Government Contract/Purchase Order No. DE-FC2602NT41246. The Government has certain rights in this invention.

TECHNICAL FIELD

The present invention relates to solid oxide fuel cell (SOFC) systems; more particularly, to such systems wherein a portion of the anode tail gas from an SOFC stack is re-used by recycle; and most particularly, to a system wherein a portion of the anode tail gas is recirculated directly into the fuel cell stack.

BACKGROUND OF THE INVENTION

SOFC stack systems are well known. An SOFC typically is fueled by "reformate" gas, which is the partially oxidized effluent from a catalytic partial oxidation (CPOx) hydrocarbon reformer. Reformate typically includes amounts of carbon monoxide (CO) as fuel in addition to molecular hydrogen ($H_2$). The CPOx reactions also release heat that serves to maintain the temperature of the reformer. A CPOx reformer is a very simple and easily controlled device with good transient behavior and dynamic range. A known disadvantage of a CPOx reformer is that it has a relatively low fuel processing efficiency, generally in the range of 70-90%, that results in reduced overall system efficiency.

To improve stack power density and system efficiency and to reduce carbon precipitation and deposition in the system, it is known in the art to recycle a portion of the tail gas from the stack anodes into the inlet to the reformer. The stack anode tail gas has a large amount of water vapor and $CO_2$ as well as unreacted $H_2$ and CO gases. When these gases are fed back to the reformer, endothermic "steam reforming" reactions occur in the fuel reformer in the well-known "water gas" reaction. Stack anode tail gas recycle is known to be enhanced by fuel reformer technology that can sustain its temperature in the presence of endothermic reactions. Such technology may consist of a heat exchanger construction whereby hot combustor effluent passes on one side of the heat exchanger (combustor side), and fuel, air, and recycle gas mix passes through the other side (reforming side). The reforming side is catalytically treated to allow for the preferred reactions to occur. This mechanization yields high fuel processing efficiencies that, in turn, yield high system efficiencies.

Disadvantages to this approach are the complexity and potential durability issues with the heat exchanger/reformer device because of the higher temperatures required for endothermic reforming; the system complexity required to channel the combustor gases through the reformer; and the potential for carbon precipitation in the produced reformate which has low water vapor content by volume.

Where natural gas fuel is used, steam reforming with added water (no recycle) is a very common approach. In some cases, the natural gas fuel is pre-reformed to break-down higher hydrocarbons (above methane) and this high-methane mix is fed directly to an SOFC stack. $H_2O$ is typically added to the reformate to allow steam reforming reactions to occur within the SOFC stack itself. This arrangement is known as "Internal Reforming" in the art. In this approach, the heat to required for endothermic reforming to occur is supplied by the electrochemical heat released in the SOFC stack, and not by heat exchange with the combustor gases. Internal endothermic reforming within the SOFC stack is very attractive for its high fuel processing efficiencies, but in the prior art it requires a supply of external water injection to the system.

What is needed in the art is a system for internal reforming that requires no external source of water, achieves high fuel processing efficiency, and permits simple construction and operation of the fuel reformer.

It is a principal object of the present invention to improve the fuel efficiency of a solid oxide fuel cell system.

SUMMARY OF THE INVENTION

Briefly described, in an SOFC stack system in accordance with the invention, a conventional CPOx reformer supplies reformate to the stack. A portion of the resulting anode tail gas, which is rich in $H_2$, $CO_2$, and $H_2O$, is recycled directly into the anode inlet of the stack. Thus the fuel reaching the anodes is a mixture of fresh reformate and recycled anode tail gas and is present at a sufficiently high temperature that endothermic reforming of residual hydrocarbons from the CPOx reformer occurs within the stack. In a currently preferred embodiment, an amount of secondary non-reformed fuel is also added to the recycled anode tail gas to optimize the fuel mixture presented for internal reforming.

An advantage of this arrangement is that the anode tail gas has the highest oxygen/carbon ratio anywhere in the system and also has a high concentration of $H_2O$ and $CO_2$. Therefore, the anode tail gas has the least tendency to have carbon precipitation with the injection of secondary fuel.

A further advantage is that the anode tail gas is hot, nominally at the stack operating temperature of about 750-800° C. This allows for the mixture of anode tail gas, containing water vapor and $CO_2$, and secondary fuel to be mixed and reacted without additional oxygen in a clean-up catalyst prior to being mixed with reformate, to react longer chain hydrocarbons in the secondary fuel.

A still further advantage is that the resulting mixture of gases may be rapidly cooled and fed to a recycle pump, thereby reducing the thermal demand on such a pump. Cooling and pumping the pre-reformed mixture provides an extra degree of good mixing of the anode tail gas and secondary fuel without further reactions occurring before entering the anodes.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
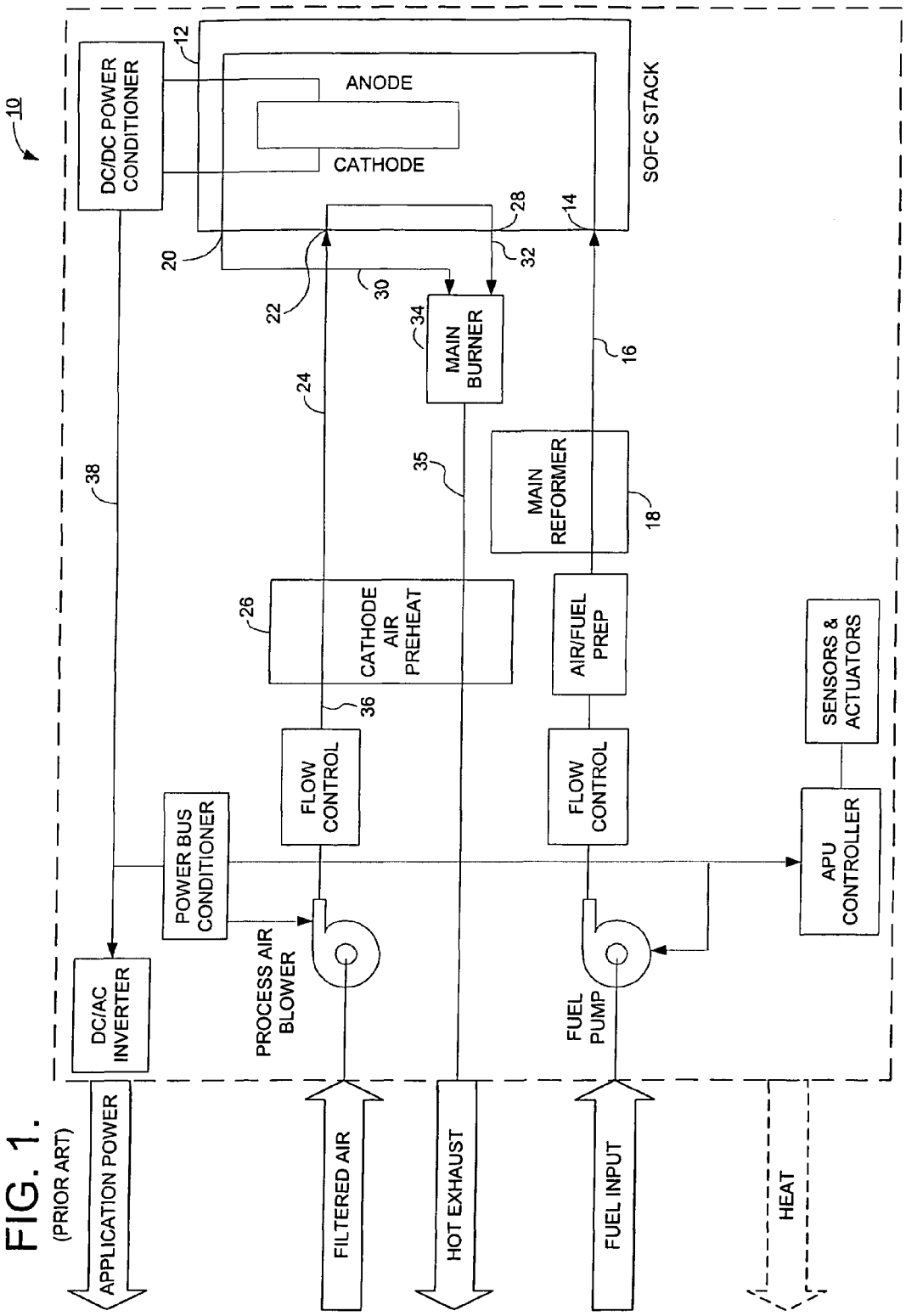
FIG. 1 is a schematic flow diagram of a prior art SOFC system without recycle of anode tail gas.

Referring to FIG. 1, a first prior art SOFC system 10 comprises an SOFC stack 12 having an anode inlet 14 for reformate 16 from a CPOx reformer 18; an anode tail gas outlet 20;

an inlet 22 for heated cathode air 24 from a cathode air heat exchanger 26; and a cathode air outlet 28. Anode tail gas 30 and spent cathode air 32 are fed to a burner 34, the hot exhaust 35 from which is passed through heat exchanger 26 to heat the incoming cathode air 36. The residual potential chemical energy ($H_2$ and CO) in the anode tail gas is not recovered as additional electrical output 38 of the stack but instead is partially recovered as heat energy in a heat exchanger 26.

Figure 2:
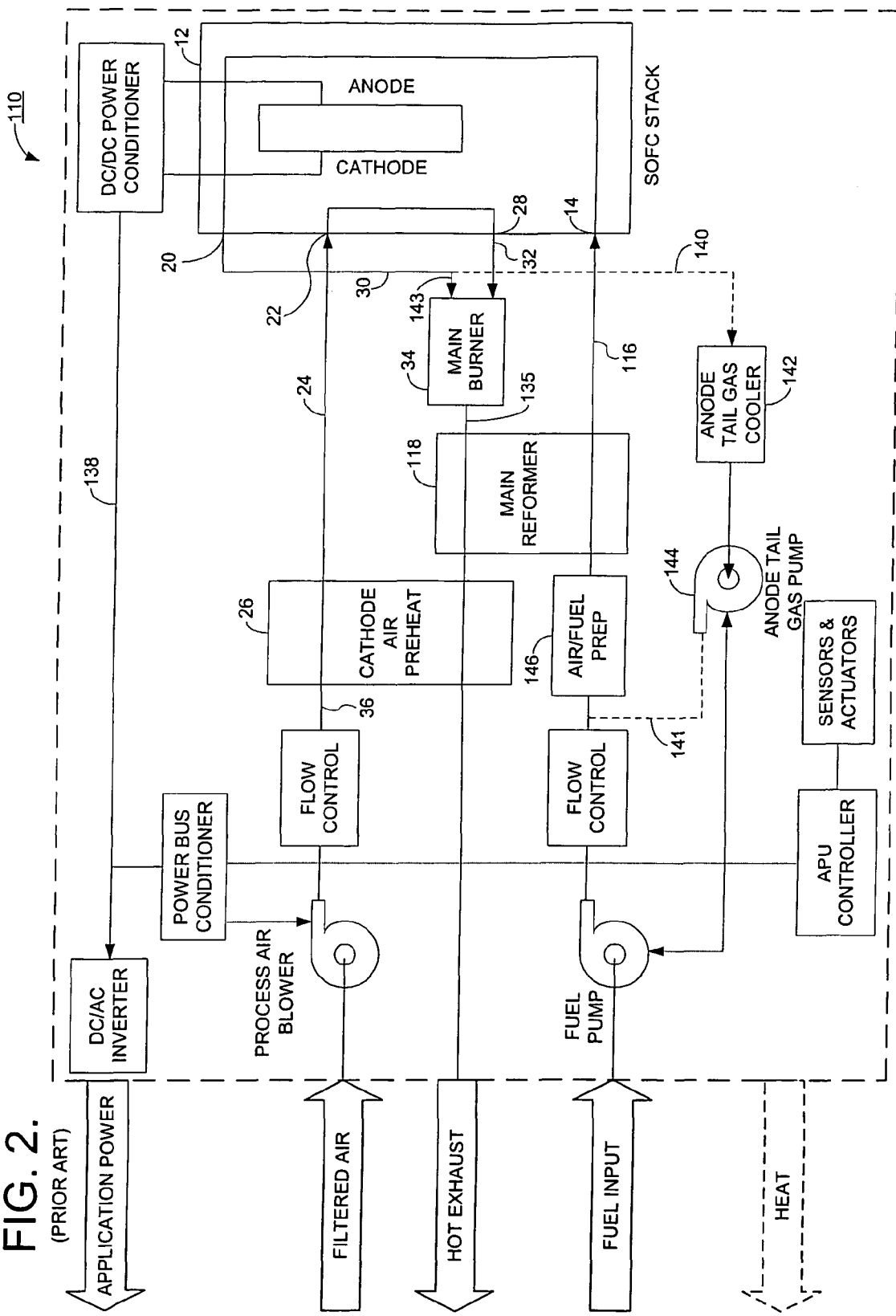
FIG. 2 is a schematic flow diagram of a prior art SOFC having recycle of anode tail gas into the fuel stream ahead of the reformer.

Referring to FIG. 2, a second prior art SOFC system 110 comprises the elements just described for first prior art system 10. However, in addition a first portion 140 of anode tail gas 30 is diverted ahead of burner 34 to an anode tail gas cooler 142 and thence through an anode tail gas pump 144 which directs cooled portion 141 into an entrance to an air/fuel preparation chamber 146 ahead of CPOx reformer 118. Second portion 143 of anode tail gas 30 is sent to burner 34 as in embodiment 10, and the hot effluent 135 is sent to cathode air heat exchanger 26 via a prior heat exchanger in reformer 118. Fortified reformate 116 is sent to stack anode inlet 14. Thus, residual hydrogen and carbon monoxide in the anode tail gas are transmitted to the stack for a second time, and heat is recovered in both the reformer and the cathode air heater. A heat source is critical to maintain the elevated temperatures in the reformer during endothermic reforming. System 110 is known to improve significantly the fuel processing efficiency of an SOFC system, resulting in an increase in electrical output 138, or a decrease in the amount of fuel needed to provide a fixed power output. However, as noted above, significant practical problems are known in operating system 110, including a tendency for coking of the reformer, the increased complexity of the fuel reformer/heat exchanger, and substantial thermal stresses on the reformer because of the elevated temperatures.

Figure 3:
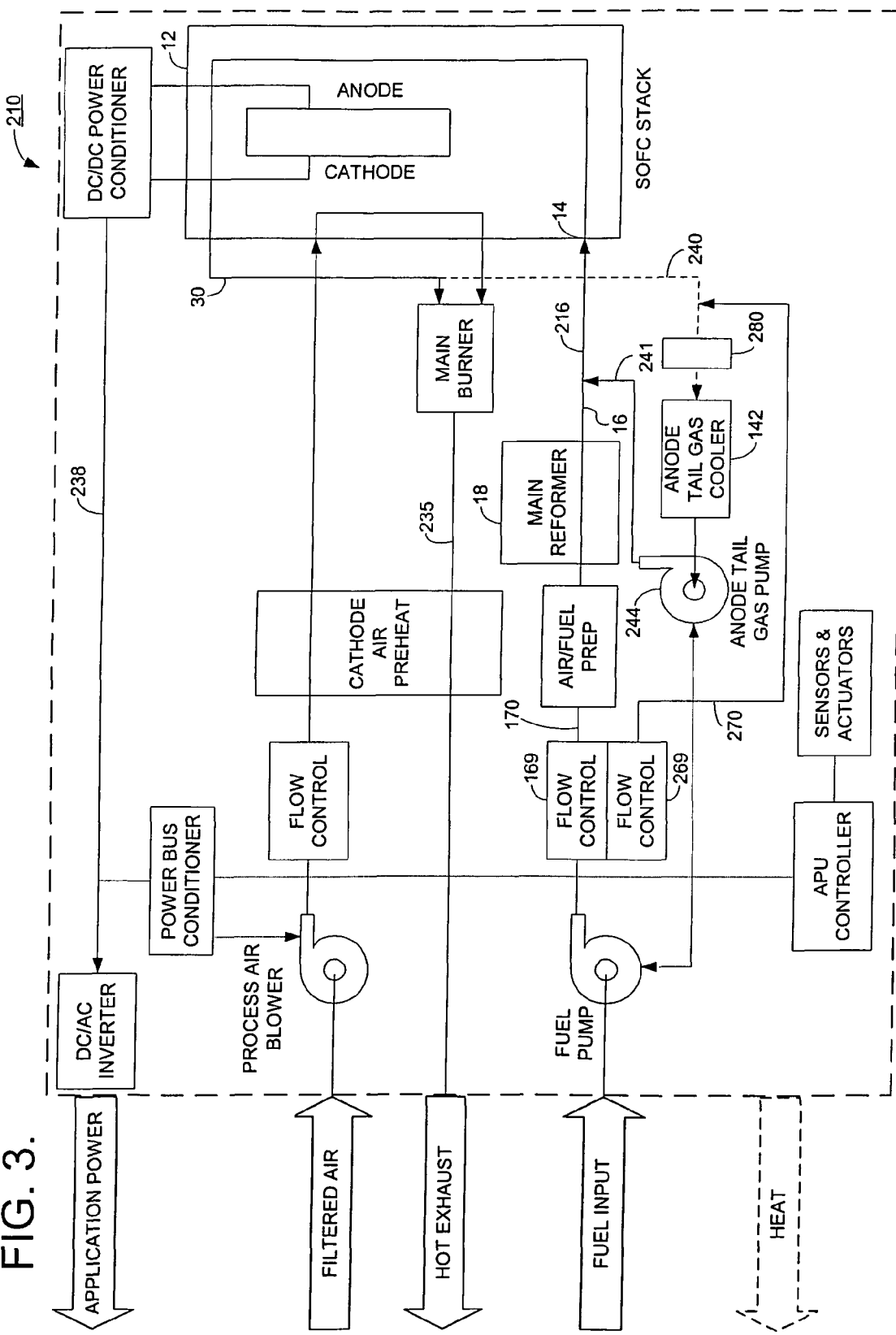
FIG. 3 is a schematic flow diagram of an SOFC system in accordance with the invention, showing recycle of anode tail gas into the inlet to the SOFC stack.
Figure 4:
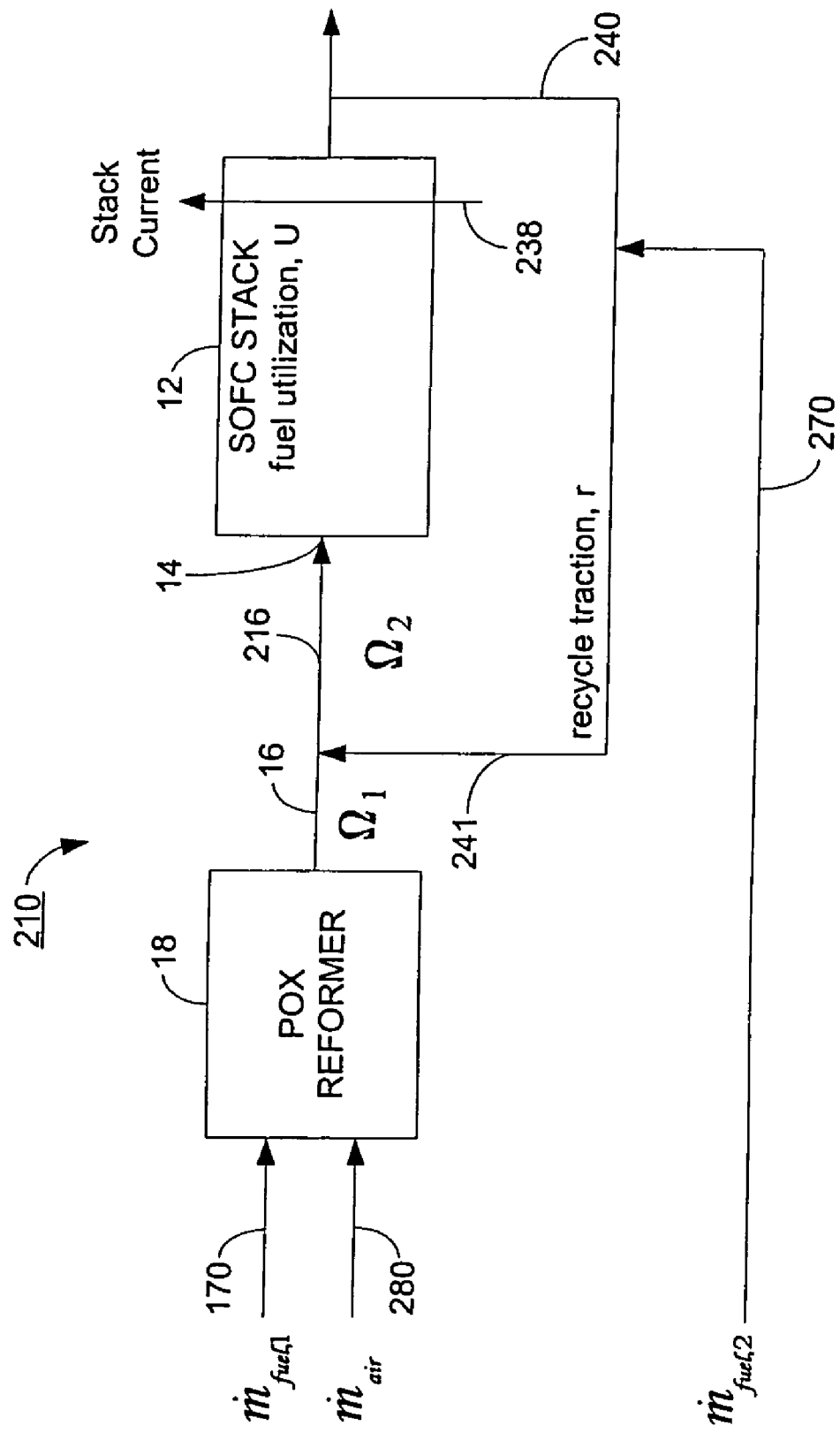
FIG. 4 is a detailed flow diagram of the recycle and mixing portion of the diagram shown in FIG. 3.

Referring to FIGS. 3 and 4, the arrangement of SOFC system 210, improved in accordance with the invention, is substantially the same as that of prior art embodiment 110 except for the following: Anode tail gas outlet 241 from pump 244 is directed via pump 244 to the anode inlet 14 of stack 12, bypassing reformer 18, where the anode tail gas joins with reformate 16 from reformer 18 to form a feed stream 216. The burner effluent 235 bypasses reformer 18, as the undesirably high reforming temperatures required in embodiment 110 are no longer necessary. In addition to the primary, independently controlled fuel flow 169 supplying fuel 170 to reformer 18, a secondary, independently controlled fuel flow 269 is provided for supplying secondary fuel 270 into anode tail gas portion 240 to optimize the fuel stream 216 provided to stack anode inlet 14. Preferably, the tail gas/secondary fuel mixture is passed through a clean-up catalyst 280 to reduce longer chain hydrocarbons to methane, $H_2$, and CO.

Primary fuel reformer 18, which is a simple and robust CPOx technology reformer, supplies between 0% and 100% of the reformate to the SOFC stack, with typical values between 30% and 70%. At 100%, there is no secondary fuel flow 270 to the recycle stream 216 and no internal reforming in the stack (0% internal reforming). At 0%, there is no CPOx reformate 16 to the stack and all of the fuel 241 is internally reformed (100% internal reforming). Both 0% and 100% cases are known in the art, but the subject of this invention allows for a mixture of CPOx and Stack Internal Reforming strategies (between 0% and 100% internal reforming). This blended strategy, referred to herein as "Light Internal Reforming", generally results in a reformate stream 216 to the stack that has a high concentration of $H_2$ and $H_2O$, as well as moderate amounts of CO and $CO_2$, and a small amount (usually under 12%) of methane gas ($CH_4$). This arrangement allows for endothermic reforming within the stack itself for high fuel processing efficiencies and high electric output 238. Further this arrangement allows for reduced internal reforming load (<100%) on the stack which can improve durability. In addition, the CPOx reformer primary fuel processing serves the needs of the system during the start-up phase when the stacks are not operational but are warming-up, as well as under transient conditions where less internal reforming may be desirable.

Technical Governing Equations:

Referring to FIG. 4, Omega ($\Omega$) is the oxygen/carbon (O:C) ratio of the gas mixture at the described point. The O:C ratio is given by equation 1.

$$\Omega = \frac{\text{moles O}}{\text{moles C}} \qquad \text{Eq. (1)}$$

The Primary Fuel Fraction, Psi ($\psi$), is given by equation 2. This is the portion of the total system fueling being reformed by the CPOx reformer. Note that 1-$\psi$ is the portion of the total system fueling reformed internally of the SOFC stack.

$$\psi_1 = \frac{\dot{m}_{fuel,1}}{\dot{m}_{fuel,total}} = \frac{\dot{m}_{fuel,1}}{\dot{m}_{fuel,1} + \dot{m}_{fuel,2}} \qquad \text{Eq. (2)}$$

The Primary Fuel Fraction may be expressed as a function of system fuel utilization [U], recycle fraction [r], $\Omega_1$, and $\Omega_2$, and the fuel H:C ratio [h2c] in equation 3. This equation is derived from the molar balance in FIG. 4.

$$\psi_1 = \left(\frac{\Omega_2 - U\left(\frac{r}{1-r}\right)\left(2 - \Omega_2 + \frac{h2c}{2}\right)}{\Omega_1}\right); \Omega_1 <= \Omega_2, \qquad \text{Eq. (3)}$$

Also from mole balance, the total fueling of the system can be described in terms of stack current [$I_{stack}$], number of stack cells in series [$N_{cells}$], and the fuel properties including molecular weight (MW, g/mole) and stoichiometric coefficient of carbon ($x_{fuel}$, where $C_xH_y$ is the fuel molecule).

$$\dot{m}_{fuel,total} = \left(\frac{I_{stack} \times N_{cells,stacks}}{192970618}\right)\left(\frac{MW_{fuel}}{U(x_{fuel})\left(1 + \frac{r}{1-r}\right)\left(2 - \Omega_2 + \frac{h2c}{2}\right)}\right) \qquad \text{Eq. (4)}$$

From equations 3 and 4, the primary and secondary fuel rates may be computed as:

$$\dot{m}_{fuel,1} = \psi_1 \dot{m}_{fuel,total} \qquad \text{Eq. (5)}$$

and:

$$\dot{m}_{fuel,2} = \dot{m}_1(1-\psi_1) \qquad \text{Eq. (6)}$$

$\psi_1$ ranges between 0 and 1 with 0 corresponding to the case of 100% internal reforming and 1 corresponding to the case of CPOx reforming with stack recycle (no internal reforming). For a given target $\Omega_1$ and $\Omega_2$, and a given stack fuel utilization, U, the limiting recycle fractions describing the limits of $\psi_1$ are given by equations 7 and 8.

$$r_{min} = \left(\frac{(\Omega_2 - \Omega_1)}{U\left(2 - \Omega_2 + \frac{h2c}{2}\right) + \Omega_2 - \Omega_1}\right); \psi = 1 \quad \text{Eq. (7)}$$

$$r_{max} = \left(\frac{(\Omega_2)}{U\left(2 - \Omega_2 + \frac{h2c}{2}\right) + \Omega_2}\right); \psi = 0 \quad \text{Eq. (8)}$$

To compute the effective reformer (fuel processing efficiency) of the system, the constants k and F in equations 9 and 10 may be computed, and the efficiency computed in equation 11.

$$k = \frac{\left(2 - \Omega_2 + \frac{h2c}{2}\right)}{\left(1 + \frac{h2c}{2}\right)} \quad \text{Eq. (9)}$$

$$F = kx_{fuel}\left(\frac{\frac{1}{2}h2c(LHV_{H2,mole}) + LHV_{CO,mole}}{LHV_{fuel,mole}}\right) \quad \text{Eq. (10)}$$

$$\eta_{reformer} = F\left(1 + \frac{r}{1-r}\right) \quad \text{Eq. (11)}$$

For completeness describing FIG. 4, the air flow 280 to the primary CPOx reformer 18 may be computed from equation 12.

$$(A/F)_{reformer} = \left(\frac{\dot{m}_{air}}{\dot{m}_{fuel,1}}\right) = \quad \text{Eq. (12)}$$

$$\left(\frac{x_{fuel}MW_{air}}{MW_{fuel}}\right)\left(\frac{\Omega_1\left(1 + U\left(\frac{r}{1-r}\right)\right) - U\left(\frac{r}{1-r}\right)\left(2\frac{h2c}{2}\right)}{0.42}\right)$$

The benefits from Light Internal Reforming in accordance with the invention may be demonstrated numerically for a system with, for example, 60% fuel utilization, and $\Omega_1$ of 1.25 in Table I. Note that high recycle fractions and lower $\Omega_2$ values tend to improve reforming efficiency. Reforming efficiencies described in Table I may be over 100%, and may be as high as 159%, because it is calculated as the Lower Heating Value (LHV) of the reformate to the Stacks divided by the LHV of the fuel input to the system. Since the reformate to the stacks contains recycled gases containing fuels, the reforming efficiency can exceed 100%.

TABLE I

Effective Reforming (Fuel Processing) Efficiencies for LIR

| Estimated Effective Reforming Efficiency Recycle | O2C2 1.5 | 1.55 | 1.6 | 1.65 | 1.7 | 1.75 | 1.8 |
|---|---|---|---|---|---|---|---|
| 0% | 80% | 78% | 76% | 75% | 73% | 72% | 70% |
| 10% | 88% | 87% | 85% | 83% | 81% | 80% | 78% |
| 15% | 94% | 92% | 90% | 88% | 86% | 84% | 82% |
| 20% | 100% | 98% | 96% | 94% | 92% | 90% | 88% |
| 25% | 106% | 104% | 102% | 100% | 98% | 96% | 93% |
| 30% | 114% | 112% | 109% | 107% | 105% | 102% | 100% |
| 35% | 123% | 120% | 118% | 115% | 113% | 110% | 108% |
| 40% | 133% | 130% | 127% | 125% | 122% | 119% | 117% |
| 45% | 145% | 142% | 139% | 136% | 133% | 130% | 127% |
| 50% | 159% | 156% | 153% | 150% | 147% | 143% | 140% |

Table II describes the values for $\psi_1$ and the limiting recycle cases for the reforming efficiencies tabulated in Table I. Note that calculated values for $\psi_1$ that are above 1 or below 0 are outside the limit recycle fractions. Under these conditions, the system is either operating in full internal reforming domain ($\psi_1 \leq 0$, or zero internal reforming domain ($\psi_1 \geq 1$) and $\Omega_2$ is not held to the target in the table (violates equations). Under most cases of practical interest to the system, the targeted values for $\psi_1$ are between 0.3 and 0.7.

TABLE II

LIR Primary Fuel Split Fraction and Limiting Recycle Fractions

| | O2C1 Utilization | | 1.25 60% | | | | |
|---|---|---|---|---|---|---|---|
| Recycle | O2C2 1.5 | 1.55 | 1.6 | 1.65 | 1.7 | 1.75 | 1.8 |
| Formula for psi1 (2) Fuel split fraction (psi) | | | | | | | |
| 0% | 1.20 | 1.24 | 1.28 | 1.32 | 1.36 | 1.40 | 1.44 |
| 10% | 1.07 | 1.11 | 1.15 | 1.19 | 1.24 | 1.28 | 1.32 |
| 15% | 0.99 | 1.03 | 1.08 | 1.12 | 1.17 | 1.21 | 1.25 |
| 20% | 0.90 | 0.95 | 0.99 | 1.04 | 1.08 | 1.13 | 1.18 |
| 25% | 0.80 | 0.85 | 0.90 | 0.94 | 0.99 | 1.04 | 1.09 |
| 30% | 0.69 | 0.74 | 0.79 | 0.84 | 0.89 | 0.94 | 0.99 |
| 35% | 0.55 | 0.61 | 0.66 | 0.71 | 0.77 | 0.82 | 0.87 |
| 40% | 0.40 | 0.46 | 0.51 | 0.57 | 0.62 | 0.68 | 0.74 |
| 45% | 0.22 | 0.28 | 0.34 | 0.40 | 0.46 | 0.516 | 0.58 |
| 50% | 0.00 | 0.06 | 0.13 | 0.19 | 0.26 | 0.32 | 0.38 |
| Formula for rmin recycle minimum for psi1 <= 1 | | | | | | | |
| | 14% | 17% | 20% | 22% | 25% | 27% | 29% |
| Formula for rmax Formula for rmin recycle maximum for psi1 >= 0 | | | | | | | |
| | 50% | 51% | 53% | 54% | 55% | 56% | 58% |

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for operating a solid oxide fuel cell assembly including a hydrocarbon reformer, a fuel cell stack having an anode inlet and an anode outlet, and an anode tail gas cooler, comprising the steps of:

providing a reformate fuel from said hydrocarbon reformer to said anode inlet of fuel cell stack;

diverting a first portion of anode tail gas from said anode outlet of fuel cell stack to said anode tail gas cooler and cooling said first portion of anode tail gas;

combining cooled first portion of anode tail gas with said reformate fuel downstream of said hydrocarbon reformer and upstream of said anode inlet of fuel cell stack; providing a clean-up catalyst upstream of said anode tail gas cooler and downstream of said anode outlet of fuel cell stack, said clean-up catalyst reduces said first portion of anode tail gas to methane, H2, and CO;

providing a primary controller controlling the flow of a first hydrocarbon fuel to said hydrocarbon reformer; providing a secondary controller controlling the flow of a second hydrocarbon fuel to combine with said first portion of anode tail gas upstream of said clean-up catalyst and downstream of said anode outlet of fuel cell; and further comprising the step of providing a non-recirculated hydrocarbon fuel to said reformer.

2. The method of operating a solid oxide fuel cell assembly of claim 1, further comprising the steps of:

providing a common hydrocarbon fuel feed stream to both of said primary controller and said secondary controller.

3. The method for operating a solid oxide fuel cell assembly of claim 1, further comprising the steps of:

providing a main burner downstream of said anode outlet of fuel cell, wherein said first portion of anode tail gas is diverted upstream of said main burner;

providing a cathode air heat exchanger downstream of said main burner;

diverting a second portion of anode tail gas from said anode outlet of fuel cell stack to said main burner and heating said second portion of anode tail gas;

conveying heated second portion of anode tail gas directly to said cathode air heat exchanger and by-passing said hydrocarbon reformer.

* * * * *